United States Patent [19]

Roehm

[11] 3,906,109

[45]*Sept. 16, 1975

[54] BLOOD CLOTTING DEPRESSANT THERAPY

[76] Inventor: Dan Christian Roehm, 808 N.E. 20th Ave., Ft. Lauderdale, Fla. 33304

[ * ] Notice: The portion of the term of this patent subsequent to July 1, 1992, has been disclaimed.

[22] Filed: Sept. 26, 1972

[21] Appl. No.: 292,404

Related U.S. Application Data

[63] Continuation-in-part of Ser. No. 224,964, Feb. 9, 1972, Pat. No. 3,892,865.

[52] U.S. Cl. .............................................. 424/325
[51] Int. Cl............................................. A61k 27/00
[58] Field of Search ................................... 424/325

[56] References Cited
OTHER PUBLICATIONS
Chemical Abstracts 55: 26246e (1961).

*Primary Examiner*—Jerome D. Goldberg
*Attorney, Agent, or Firm*—Cushman, Darby & Cushman

[57] ABSTRACT

This invention relates to a method for depressing blood clotting by the administration of certain amines, especially lower alkanolamines. The administration to animals, including humans, is when the animal is in a fasting state and the blood clotting activity is depressed to just at or just beyond the limit of the normal blood clotting range.

9 Claims, No Drawings

BLOOD CLOTTING DEPRESSANT THERAPY

RELATED APPLICATION

This is a continuation-in-part of a co-pending application, Ser. No. 224,964, filed Feb. 9, 1972 now U.S. Pat. No. 3,892,865, the entire disclosure of which is incorporated herein by reference.

In the said co-pending application there is disclosed a method of controlling the serum lipids of animals, including man, by a critical mode of administration of certain amines, i.e., alkylamines, especially lower alkanolamines. That specification discloses that the amines perform unusual functions in the body but that those functions can radically change with changed conditions of administration. Indeed, directly opposite results can be observed with changing administration conditions. Thus, the method of that invention does not reside simply in administering the amines for accomplishing the desired effect, but the administration must be in a critical mode to obtain the desired result.

While not bound by theory, that specification postulates that the amines stimulate the lipid catabolism (combustion) function of the liver and thus lower the serum lipid content of the blood stream. It appears that the amines cause the liver to function, for a period of time, as if the liver were in a state of extreme fasting or starvation, i.e., the liver burns fats almost exclusively, as opposed to otherwise available sugars and like constituents in the blood stream.

BACKGROUND OF THE INVENTION

Malfunctions of the body circulatory system are leading causes of death and/or permanent disability, especially in certain Western nations such as the United States. These malfunctions are often colloquially referred to as "heart attacks", "strokes" and the like, but are in reality manifestations of circulatory blockage. A significant cause of the blockage is now recognized to be the continued consumption of high fat diets and consequently these malfunctions have been described as the chronic epidemic of affluent countries. There are, however, additional causes of these malfunctions including injuries, improper blood conditions and special diseases, such as phlebitis. All of the malfunctions, however, have in common the unwanted clotting of the blood and the resulting blood clot(s) blocking blood vessels.

At present, the medical arts have only two means of combatting circulatory blockage due to blood clots, i.e., procedures aimed at lowering the blood fat and employing anticoagulant drugs. The former of these approaches is more of a preventative of, rather than a cure of, a present and existing malfunction. The latter of these, while in a sense acting as a preventative, is mainly administered to treat a present condition, i.e., circulatory blockages. Thus, for treating existing emergency conditions the medical arts have essentially available only the anticoagulant drugs.

While the details of the function and effect of the anticoagulant drugs vary somewhat, they are all essentially derivatives of coumarin or hydroxycoumarins (the short name is sodium warfarin) and virtually completely fail to be effective in the arterial side of the circulatory system. It is well-known, however, that the major threats to life come from thromboses on the arterial side of the circulatory system.

These oral anticoagulant drugs also present significant hazards in administration, especially since the drugs have unpredictable effects from patient to patient. It is, therefore, imperative that these anticoagulant drugs be administered only under strict supervision with adequate and continued blood testing for coagulation activity of the blood. Otherwise, the blood could be so "thinned" that internal hemorrhaging occurs and the patient may die before the blood clotting properties can be properly adjusted. It is estimated that the present risk, even with adequate supervision and blood testing, of the anticoagulant drugs, is at least 1 percent-per year-per patient. Indeed, this is a very significant risk, especially when considered with the fact that the drug is effective essentially only on the venous side of the circulatory system.

Basically, evidence indicates that the anticoagulant drugs function in the latter stages of the clotting process and a number of initial clotting steps have already taken place before the drug enters into the process. The clotting process has proceeded to at least the stage of a "white thrombus" before the drug acts and the thrombus, which consists principally of blood platelets, is generally unaffected by these later acting anticoagulants. Thus, the drugs do not function soon enough in the clotting process to decisively halt clotting in the earlier stages where special benefits may be obtained. Further, the dosages required to effectively reduce the amount of blood clotting of these later acting drugs presents the hazard of too much blood "thinning" and internal hemorrhaging, as noted above.

In view of the foregoing, many experts in the field of the circulatory system have expressed grave doubt on the advisability of administering these anticoagulant drugs, except in extreme cases. This is especially true in view of the unpredictable nature of the drug from patient to patient and in view of the fact that the drug is effective only on the venous side of the circulatory system.

OBJECTS OF THE INVENTION

From the foregoing it is obvious that a need exists in the art for a method of depressing blood coagulation on both the arterial and venous sides of the circulatory system. Also, a more predictable effect of the coagulation depressant therapy and a therapy which is less severe in the anticoagulating functions would be desirable. It is, therefore, an object of the present invention to provide a therapy of depressing the blood coagulation function which enjoys the foregoing desired characteristics. It is also an object to provide a therapy which is easy to administer, which has no known adverse side effects and which does not require continued laboratory tests and supervision. Other objects will be apparent from the following detailed description of the invention.

BRIEF DESCRIPTION OF THE INVENTION

It has now been discovered that lower alkyl amines, especially lower alkanolamines, can be administered with a particular mode of administration to function in depressing blood coagulation on both the arterial and venous sides of the circulatory system. The anticoagulating action of the present therapy ensues at the onset of the blood coagulating process and operates in a mild manner to prevent thrombosis. An important feature of the invention is the ability of the present method to provide blood coagulating properties which are not grossly abnormal, as is the case with available anticoagulant drugs and methods. Indeed, a particularly important feature of the invention is to provide coagulating properties of blood which are just at or just beyond the normal range.

DETAILED DESCRIPTION OF THE INVENTION

It has now been discovered that the amines defined below, especially the lower alkanolamines, can be administered under certain fasting conditions, as hereinafter fully defined, to depress the coagulation properties of the blood to just at or just beyond the normal range and thus provide a mild but effective anticoagulant therapy. This therapy, being effective on both the arterial and venous sides of the circulatory system, has special advantages for many of the circulatory diseases and malfunctions. Thus, the method is applicable to a wide variety of diseases and malfunctions including any thrombosis, circulatory blockages and the like.

The compounds useful in the present invention comprise the lower alkyl amines. The alkyl groups may be either straight-chained, such as methyl, ethyl, propyl, or butyl, or branched, such as isopropyl and isobutyl. The amines may be substituted and are primary, secondary or tertiary amines of the formula:

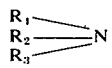

where $R_1$, $R_2$ and $R_3$ are hydrogen and alkyl groups of up to six carbon atoms, provided that not each of $R_1$, $R_2$ and $R_3$ is hydrogen. The alkyl groups may be substituted with at least one and up to three alkyl-attached OH groups or substituted with one aryl group, e.g. benzene and toluene groups. However, it has been found that the hydroxy substituted alkyl amines, i.e., where at least one of $R_1$, $R_2$ and $R_3$ are alkanol groups, are far more effective than the unsubstituted alkyl or substituted aryl alkyl amines. Thus, the alkanol amines constitute the best mode of the invention. With polyhydroxy alkanol amines, it is preferred that the OH groups be on different carbon atoms and preferably on carbon atoms away from the nitrogen atom. The preferred embodiments are monoethanolamine, diethanolamine and triethanolamine, especially diethanolamine.

The amines of the present invention are basic in nature, and it is preferred to adjust the pH thereof to between 4 and 8, more preferably to essentially neutralize the amines, with a nontoxic pharmaceutically acceptable salt-forming acid. The salts of the amines may be formed with acids such as a mineral acid, e.g., hydrochloric acid, nitric acid and sulfuric acid, or an organic acid such as acetic acid, citric acid, tartaric acid, lactic acid, ascorbic acid, methanesulfonic acid, ethanesulfonic acid, quinic acid, 3-hydroxy-2-naphthoic acid, naponic acid (1,5-naphthalene-disulfonic acid), acetylsalicylic acid, salicylic acid, mucic acid, muconic acid and the like. Hereinafter the term "amines" is intended to include non-toxic pharmaceutically acceptable salts thereof.

According to the present invention, the amines are prepared for administration to the patient either as a solution, suspension or elixir, or as a tablet, troche, capsule or the like. Thus, the amines may be mixed with any desired inert diluent, extender, carrier, tableting powder, etc., but the amines will be the only active ingredient. Thus, in this specification, the compositions to be administered are only of inert ingredients and the present active amines and this definition is referenced as consisting essentially of the defined amines.

The compositions may be intravenously or subcutaneously administered, but oral administration is more convenient and enjoys a wider patient acceptability. Thus, oral administration is preferred although other methods of administration may be used if desired.

The conditions of the administration of the amines are most important in achieving the desired result. The effect of the amines depends on the lipid content of the bloodstream when the amines are administered to the patient. Higher post prandial lipid contents in the bloodstream must be avoided or the effect of administration of the amine will not be that desired and the effects obtained may even be dangerous. Accordingly, the amines are administered only when the lipid content of the blood is below a maximum level.

Since the response to the amines will vary somewhat from patient to patient, even with essentially the same absolute level of lipids in the bloodstream, the maximum level of lipids in the bloodstream for any one patient may be determined by appropriate tests. Thus, the blood may be tested 1 to 2 hours after administration of the amines, and if the lipid, e.g., trigylcerides, content abnormally increases, then the blood of that patient contained too high a lipid level for administration of the amine. If the lipid content decreases below the pretreatment level, then the patient had less than the maximum permissible amount of lipids in the bloodstream and the administration of the amine will produce the desired results.

That level of lipids in the bloodstream which results in the amine administration dropping the lipid content to below the pre-administration content is defined herein as the fasting state of the patient. This fasting state can be obtained by simply administering the amines only at a time significantly after the last substantial food intake and significantly before the next substantial food intake of the patient.

For purposes of the present specification, the term "lipid" is used in the broader sense and is intended to embrace related compounds, especially cholesterol. Thus, in referencing lipid levels in the blood, related compounds including cholesterol are intended to be embraced thereby.

The amines are administered in daily dosages ranging from 10 mg to about 20g (calculated as the amine and excluding any neutralizing salt moiety). This dosage is administered while the patient is in the fasting state as noted above. While not required, dosage may be administered in a so-called "time release" capsule, taken with a meal, wherein the time release capsule disintegrates in the stomach and empties the amine contents into the stomach at no earlier than 1 hour from the time of the meal and no later than 5 hours after the time of the meal. This allows the dosages to be taken at easily rememberable times, i.e., mealtimes, and yet allows the effective dosage to be at a time when the body is in the fasting state. Generally, the anticoagulation action is obtained with daily dosages ranging from 10 mg to 10 g and especially from 50 mg to 2–4 g. Of course, individual dosages may be administered throughout the day, as long as the total daily dosage is in the above range, or the entire dosage may be given at one time.

In this latter regard, however, it is preferable that the dosage be given during some extended fasting period, such as at least 2 hours after the last meal of the day or at bedtime or the like.

These dosage levels do not approach the toxic limits. For example, *Chemical Abstracts* 73: 118615 reports the toxicity of diethanolamine in mice as 2,050 mg/kg, rabbit 1,000 mg/kg and guinea pig 620 mg/kg. These values are given to illustrate the substantially innocuous character of the present amines.

As noted hereinbefore, oral administration of the amines may be by way of tablets, capsules, elixirs, syrups and suspensions or as desired. Preferably oral administration is by way of tablets or capsules which are formulated in manners well known to pharmaceutical art, utilizing any inert U.S. pharmacopoeia excipients such as lactose, starch, terra alba, magnesium stearate, calcium sulfate, glycerylmono or distearate, gelatin, or wax. Or if the administration is subcutaneously, any U.S.P. injection vehicle such as sterile water or saline solution may be used. However, it is not necessary that the amines be diluted or extended at all and may be given in the undiluted or unextended form. Of course, as noted above, it is preferred that the amine be neutralized with a pharmaceutically acceptable acid.

The effectiveness of the invention will be illustrated by the following examples wherein, unless otherwise indicated, all parts and percentages are by weight, all dosages are calculated as the amine and all subjects are human.

EXAMPLE 1

The Plasma Recalcification Time (PRT) measures the number of seconds required for plasma to form a clot in the test tube after introduction of calcium ions. The normal range is considered to be 90 to 120 seconds. Six consecutively tested subjects received diethanolamine (neutralized with HCl, i.e., referred to as DEA.HCl hereinafter) orally for over two months in dosages of 1 gram (calculated as the amine) twice daily 2 or more hours before the ingestion of food or 1 or more hours after the ingestion of food. The following PRT's were determined:

TABLE 1

| Subject | PRT (seconds) |
|---|---|
| 1 | 127 |
| 2 | 129 |
| 3 | 143 |
| 4 | 127 |
| 5 | 110 |
| 6 | 128 |
| Average | 127 (seconds) |

Thus, a mild but beneficial retarding of the plasma clotting rate demonstrates that the effect of the amine is to depress the clotting to just beyond the upper limit of normal PRT.

EXAMPLE 2

A simple blood clotting test is referred to as the "three tube clotting time" and this test has been used for decades. Eighteen consecutive subjects, not known to have ingested aspirin in any form for the preceding two weeks, were tested in the manner of Example 1. A similar number of subjects did not receive the DEA.HCl, but were tested at approximately the same time and in the same manner. These latter subjects had an average clotting time of 9 minutes 15 seconds.

TABLE 2

| Subject | Clotting Time (Minutes) |
|---|---|
| 1 | 11.0 |
| 2 | 9.5 |
| 3 | 10.0 |
| 4 | 8.5 |
| 5 | 10.0 |
| 6 | 9.5 |
| 7 | 12.5 |
| 8 | 8.5 |
| 9 | 10.5 |
| 10 | 9.5 |
| 11 | 11.5 |
| 12 | 18.0 |
| 13 | 8.5 |
| 14 | 10.5 |
| 15 | 9.5 |
| 16 | 10.5 |
| 17 | 9.5 |
| 18 | 11.0 |
| Average | 10 min. 24 secs. |

The three tube clotting time, therefore, shows that the amine prolonged the average clotting time by 69 seconds. The upper limit of normal clotting time for this test is 12 minutes and thus the clotting time as measured by this test is just at the upper limit of the normal clotting time.

EXAMPLE 3

The Prothrombin Comsumption Test (PCT) measures the amount of a blood clotting constituent, prothrombin, which is consumed in the act of an actual clot formation in a test tube. Following this clot, the resultant serum is tested for residual prothrombin activity. It is known that a "normal clot" utilizes prothrombin almost 100% and there is very little unused prothrombin remaining in the serum. This results in a high PCT value being considered normal (little residual prothrombin) and a very low value being considered abnormal. It is known, for instance, that a test value below 21 seconds indicates such lack of prothrombin usage that the resulting clot may be defective and bleeding may well occur. The lower limit of the normal range is thus considered as over 21 seconds but values up to as much as 80 seconds can be encountered. A PCT value which shows anticoagulation activity would, therefore, be in the lower portion of this range. According to J. Miale, *Laboratory Medicine and Hematology*, 3rd Edition, C.V. Mosby, at page 1203, of nonbleeders (normals), approximately 55% of the subjects will have PCT values in the 21–30 second range, 37% will have values in the 30–50 second range and 8% will have values in the 50–80 second range.

Bearing this distribution in mind, Table 3 shows the PCT results of the subjects treated in the same manner as in Example 2, with 1 g of DEA.HCl.

It should be noted that the PCT value of 14 of the 18 subjects or 78 % fell in the 21–30 second range (predicted 55%) and only 4 of the 18 subjects or 22% fell in the 30–50 second range (predicted 37%) and none of the subjects fell in the 50–80 second range (predicted 8%).

TABLE 3

| Subject | PCT (seconds) |
|---|---|
| 1 | 24.5 |
| 2 | 25.5 |
| 3 | 27.6 |
| 4 | 30.8 |
| 5 | 29.2 |
| 6 | 27.0 |
| 7 | 34.5 |
| 8 | 23.1 |
| 9 | 37.7 |
| 10 | 41.6 |
| 11 | 24.5 |
| 12 | 26.5 |
| 13 | 28.0 |
| 14 | 23.5 |
| 15 | 26.0 |
| 16 | 25.0 |
| 17 | 26.0 |
| 18 | 21.0 |
| Average | 28.0 (seconds) |

Also, note that the highest value is only 41.6 seconds. As a further check, 5 of the subjects were later checked for PCT times and the average was 26.9 seconds which again conforms to the results in Table 3. Thus, it is clear that the subjects who received the amine exhibited a lesser avidity in prothrombin utilization and to that same degree a resulting anticoagulation activity is achieved, even though the absolute values remain in the normal and safe range. It is generally agreed that with more efficient prothrombin consumption the firmer the clot, but also the greater the likelihood of clot growth. Blood with inhibition of clotting at the earliest platelet stage would be expected to clot less often when passing over rough atherosclerotic plaques of arteries.

From the foregoing Examples it can be seen that the objects of the invention have been obtained and that a valuable therapy is provided for treatment of circulatory diseases and malfunctions which involve blood clotting. The Examples also show that while the blood coagulation activity is adjusted by the present therapy, the coagulation activity still remains just at or just beyond the normal coagulation range. While not being bound by theory, it is believed that this most unusual and favorable result is due to a specific reaction between the amines and constituents of the blood platelets. It is known that blood platelets involved in the initial step of coagulation contain a high percentage of phospholipids, i.e., up to about 80% content. The principle phospholipids in the platelets, chemically, contain amine, and especially alkanolamine, constituents. It appears that when the present amines are administered in the fasting state at the present dosage levels, the conditions are just right for the amines to react with these constituents of the platelets, and apparently replace, at least in part, those platelet amines. It further appears that the amines which are substituted in the platelets for the natural amines have less propensity for coagulation, as opposed to the natural amines in the platelets. However, the amines substituted in the platelets can, indeed, function in the normal manner of the natural amines in the platelets and thus enter into the coagulation process at the initial stages thereof and function, generally, to cause coagulation just at or just beyond the normal range. The reduction in coagulation activity, however, is not only predictable, but is relatively mild in its effect, as shown by the foregoing Examples, and is, therefore, far less hazardous than the unpredictable and severe effects of the available therapeutic methods.

The present desired effects are, however, achieved only when the patient is in the fasting state, as noted above. Although tests for the fasting state can be made in the manner described hereinbefore, the fasting state will be achieved at times of up to 2 hours before a fatty meal and later then 1 hour after a fatty meal. A fatty meal is defined as at least 400 calories and containing at least 2 ounces of fat, as fully explained in the said copending application.

It is clear from the foregoing that modifications of the present inventive method will be easily recommended to those skilled in the art including compounding the present amines with other ingredients for treatment of specific diseases, administering the amines in conjunction with other drugs or foods and the like. These further obvious embodiments are, therefore, intended to be encompassed by the following claims.

What is claimed is:

1. A method of depressing the coagulation activity of blood in an animal host which is in need of said coagulation depression comprising administering an effective coagulation depressing amount of a composition to animals in such a fasting state that the animal host has not had a substantial food intake within 2 hours before or 1 hour after the administration of the composition, whereby the lipid content of the blood drops below the preadministration content, said substantial food intake being at least the equivalent of 400 calories and 2 ounces of fat and said composition consisting essentially of diethanolamine or the pharmaceutically-acceptable non-toxic salts thereof.

2. The method of claim 1 wherein the composition is at a pH of between 4 and 8.

3. The method of claim 1 wherein the pH of the composition is essentially neutral.

4. The method of claim 1 wherein the salt is hydrochloride.

5. The method of claim 1 wherein from about 10 mg to about 20 g per day of the said composition are administered.

6. The method of claim 5 wherein from about 50 mg to about 4 g per day of the said composition are administered.

7. The method of claim 1 wherein the animal is suffering from thrombosis.

8. The method of claim 1 wherein the animal is human.

9. The method of claim 1 wherein the animal is human and is suffering from a circulatory blockage.

* * * * *